(12) United States Patent
Wang et al.

(10) Patent No.: US 11,134,401 B2
(45) Date of Patent: Sep. 28, 2021

(54) NEIGHBOR RELATION MAINTAINING METHOD AND APPARATUS, AND NETWORK DEVICE

(71) Applicant: GUANGDONG OPPO MOBILE TELECOMMUNICATIONS CORP., LTD., Guangdong (CN)

(72) Inventors: Shukun Wang, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/988,222

(22) Filed: Aug. 7, 2020

(65) Prior Publication Data
US 2020/0374715 A1 Nov. 26, 2020

Related U.S. Application Data

(63) Continuation of application No. PCT/CN2018/106286, filed on Sep. 18, 2018.

(51) Int. Cl.
*H04W 36/00* (2009.01)
*H04W 24/02* (2009.01)
*H04W 24/10* (2009.01)

(52) U.S. Cl.
CPC .......... *H04W 24/02* (2013.01); *H04W 24/10* (2013.01); *H04W 36/0061* (2013.01); *H04W 36/0083* (2013.01)

(58) Field of Classification Search
CPC . H04W 24/02; H04W 24/10; H04W 36/0061; H04W 36/0083
See application file for complete search history.

(56) References Cited

U.S. PATENT DOCUMENTS

2011/0310791 A1   12/2011   Prakash
2013/0308481 A1   11/2013   Kazmi et al.
(Continued)

FOREIGN PATENT DOCUMENTS

CN   101651874 A   2/2010
CN   101784066 A   7/2010
(Continued)

OTHER PUBLICATIONS

International Search Report in the international application No. PCT/CN2018/106286, dated Jun. 17, 2019.
(Continued)

*Primary Examiner* — Erika A Washington
(74) *Attorney, Agent, or Firm* — Perkins Coie LLP

(57) ABSTRACT

Provided are a neighbor relation maintenance method and apparatus, including: a first node configuring measurement and instructing a terminal to report ANR-related information, or requesting a second node to configure measurement and instruct the terminal to report the ANR-related information. If the first node configures measurement and instructs the terminal to report ANR-related information, the first node maintains a neighbor relation of a cell in the first node based on the ANR-related information, and forwards the ANR-related information to the second node for maintaining a neighbor relation of a cell in the second node; if the second node configures measurement and instructs the terminal to report ANR-related information, the second node maintains the neighbor relation of the cell in the second node based on the ANR-related information, and forwards the ANR-related information to the first node for maintaining neighbor relation of the cell in the first node.

16 Claims, 3 Drawing Sheets

---

A first node configures measurement and instructs a terminal to ANR-related information, or requests a second node to configure measurement and instruct the terminal to report the ANR-related information, where if the first node configures measurement and instructs the terminal to report the ANR-related information, the first node maintains, based on the ANR-related information, a neighbor relation of a cell included by the first node, and forwards the ANR-related information to the second node for the second node to maintain a neighbor relation of a cell included by the second node; and if the second node configures measurement and instructs the terminal to report the ANR-related information, the second node maintains, based on the ANR-related information, the neighbor relation of the cell included by the second node, and forwards the ANR-related information to the first node for the first node to maintain the neighbor relation of the cell included by the first node

— 201

(56) References Cited

U.S. PATENT DOCUMENTS

| | | | |
|---|---|---|---|
| 2015/0304905 A1* | 10/2015 | Gao | H04W 36/00835 455/11.1 |
| 2016/0029253 A1* | 1/2016 | Sarkar | H04W 36/00835 455/436 |
| 2016/0150453 A1 | 5/2016 | Narayanan et al. | |
| 2017/0055186 A1 | 2/2017 | Donepudi et al. | |
| 2019/0037417 A1* | 1/2019 | Lei | H04W 72/085 |

FOREIGN PATENT DOCUMENTS

| | | |
|---|---|---|
| CN | 102244877 A | 11/2011 |
| CN | 102256284 A | 11/2011 |
| CN | 102740313 A | 10/2012 |
| CN | 104349394 A | 2/2015 |
| CN | 1005228171 A | 1/2016 |

OTHER PUBLICATIONS

VIVO. "Remaining Issue for ANR" 3GPP TSG-RAN WG2 NR AH1807 Meeting R2-1809859, Jul. 6, 2018 (Jul. 6, 2018), section 2.1 and 2.3.

VIVO. "CR on 38.300 for ANR" 3GPP TSG-RAN WG2 Meeting#102 R2-1809860 May 25, 2018 (May 25, 2018), entire document.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)" 3GPP TS 36.300 V13.0.0 (Jun. 2015), http://www.3gpp.org.

Supplementary European Search Report in the European application No. 18933991.4, dated Apr. 14, 2021.

CATT, "ANR and X2 setup for EN-DC scenario", 3GPP TSG RAN WG3 Meeting #ADHOC R3-172210, Qingdao, china, Jun. 27-29, 2017.

Qualcomm Europe, Huawei, T-Mobile, Vodafone, Telecom Italia, Alcatel-Lucent, Motorola, NSN, "Neighbor Information Exchange over X2", 3GPP TSG-RAN WG3 Meeting #61 bis R3-082851, Prague, Czech Republic, Sep. 30-Oct. 3, 2008.

Nokia, Alcatel-Lucent Shanghai Bell, "Discussion on ANR for New Radio", 3GPP TSG-RAN WG3 Meeting #95bis R3-171189, Spokane, WA, USA, Apr. 3-7, 2017.

Nokia, Alcatel-Lucent Shanghai Bell, "NR control plane architecture options for LTE-NR tight interworking", 3GPP TSG-RAN WG2 Meeting #94 R2-163511, Nanjing, China, May 23-27, 2016.

First Office Action of the Chinese Application No. 202010563778.9, dated Aug. 4, 2021.

* cited by examiner

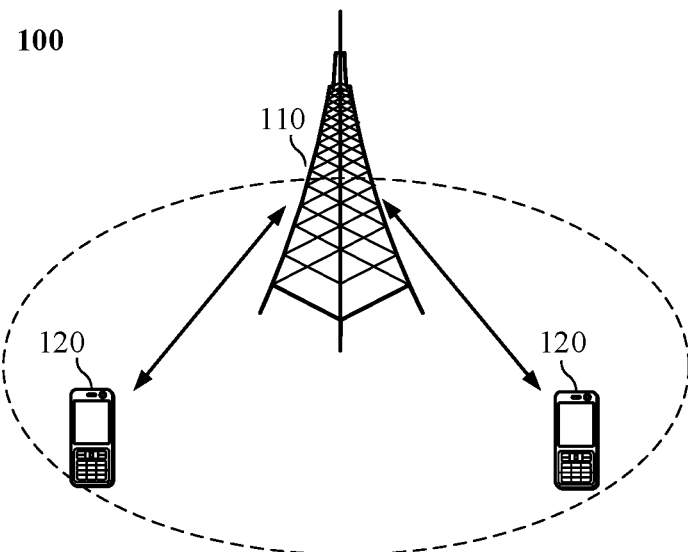

FIG. 1

| A first node configures measurement and instructs a terminal to ANR-related information, or requests a second node to configure measurement and instruct the terminal to report the ANR-related information, where if the first node configures measurement and instructs the terminal to report the ANR-related information, the first node maintains, based on the ANR-related information, a neighbor relation of a cell included by the first node, and forwards the ANR-related information to the second node for the second node to maintain a neighbor relation of a cell included by the second node; and if the second node configures measurement and instructs the terminal to report the ANR-related information, the second node maintains, based on the ANR-related information, the neighbor relation of the cell included by the second node, and forwards the ANR-related information to the first node for the first node to maintain the neighbor relation of the cell included by the first node | ─ 201 |

FIG. 2

| A first node receives a measurement report sent by a terminal, and determines, based on the measurement report, that a target cell is not in a neighbor relation list of a cell included by the first node | ─ 301 |

↓

| The first node requests, based on frequency point information and/or PCI information of the target cell, ANR-related information of a designated cell from a second node, where if the ANR-related information of the designated cell from the second node is obtainable to the first node, the first node maintains, based on the ANR-related information, a neighbor relation of the cell included by the first node; and if the ANR-related information of the designated cell from the second node is not obtainable to the first node, the first node configures measurement and instructs the terminal to report the ANR-related information, or requests the second node to configure measurement and instruct the terminal to report the ANR-related information | ─ 302 |

FIG. 3

NEIGHBOR RELATION MAINTAINING METHOD AND APPARATUS, AND NETWORK DEVICE

CROSS REFERENCE TO RELATED APPLICATION

This application is a continuation of International Patent Application No. PCT/CN2018/106286 filed on Sep. 18, 2018, the disclosure of which is hereby incorporated by reference in its entirety.

BACKGROUND

To satisfy people's pursuit in terms of a speed, a latency, high-speed mobility, and energy efficiency of a service, and diversity and complexity of a service in the further life, the $3^{rd}$ generation partnership project (3GPP) international standards organization starts to develop $5^{th}$ generation (5G) mobile communications technologies.

An air interface part of the 5G mobile communications technologies is referred to as new radio (NR). Because it is difficult to achieve full NR coverage during early deployment of NR, typical network coverage is a combination of long term evolution (LTE) coverage and NR coverage. In addition, a working mode of tight interworking between LTE and the NR is put forwarded to protect early investment of a mobile operator on the LTE. Certainly, an NR cell may alternatively be deployed independently.

In the LTE, a self-organized network (SON) is provided with an automatic neighbor relation (ANR) function, and a network node can report a found missing neighbor relation through measurement of user equipment (UE), and further maintain integrity and effectiveness of a neighboring cell list. However, such an ANR function is provided for one network node. There are two network nodes that provide services for UE in a dual connectivity (DC) network. How to implement the ANR function in such a scenario is a problem that needs to be resolved.

SUMMARY

Embodiments of this application relate to the field of mobile communications technologies and provide a neighbor relation maintaining method and apparatus, and a network device.

A neighbor relation maintaining method provided in an embodiment of this application includes:

configuring, by a first node, measurement and instructing a terminal to ANR-related information, or requesting a second node to configure measurement and instruct the terminal to report the ANR-related information, where if the first node configures measurement and instructs the terminal to report the ANR-related information, the first node maintains, based on the ANR-related information, a neighbor relation of a cell included by the first node, and forwards the ANR-related information to the second node for the second node to maintain a neighbor relation of a cell included by the second node; and if the second node configures measurement and instructs the terminal to report the ANR-related information, the second node maintains, based on the ANR-related information, the neighbor relation of the cell included by the second node, and forwards the ANR-related information to the first node for the first node to maintain the neighbor relation of the cell included by the first node.

A neighbor relation maintaining method provided in an embodiment of this application includes:

receiving, by a first node, a measurement report sent by a terminal, and determining, based on the measurement report, that a target cell is not in a neighbor relation list of a cell included by the first node; and requesting, by the first node based on frequency point information and/or PCI information of the target cell, ANR-related information of a designated cell from a second node, where if the ANR-related information of the designated cell from the second node is obtainable to the first node, the first node maintains, based on the ANR-related information, a neighbor relation of the cell included by the first node; and if the ANR-related information of the designated cell from the second node is not obtainable to the first node, the first node configures measurement and instructs the terminal to report the ANR-related information, or requests the second node to configure measurement and instruct the terminal to report the ANR-related information.

A neighbor relation maintaining apparatus is provided in an embodiment of this application, where the apparatus is applied to a first node and includes:

a measurement configuration unit, configured to configure measurement and instruct a terminal to ANR-related information, or request a second node to configure measurement and instruct the terminal to report the ANR-related information; and a requesting unit, configured to request the second node to configure measurement and instruct the terminal to report the ANR-related information, where if the first node configures measurement and instructs the terminal to report the ANR-related information, the first node maintains, based on the ANR-related information, a neighbor relation of a cell included by the first node, and forwards the ANR-related information to the second node for the second node to maintain a neighbor relation of a cell included by the second node; and if the second node configures measurement and instructs the terminal to report the ANR-related information, the second node maintains, based on the ANR-related information, the neighbor relation of the cell included by the second node, and forwards the ANR-related information to the first node for the first node to maintain the neighbor relation of the cell included by the first node.

A neighbor relation maintaining apparatus is provided in an embodiment of this application, where the apparatus is applied to a first node, and includes:

a determining unit, configured to receive a measurement report sent by the terminal, and determine, based on the measurement report, that a target cell is not in a neighbor relation list of the cell included by the first node; and a requesting unit, configured to request, based on frequency point information and/or PCI information of the target cell, ANR-related information of a designated cell from a second node, where if the ANR-related information of the designated cell from the second node is obtainable to the first node, the first node maintains, based on the ANR-related information, a neighbor relation of the cell included by the first node; and if the ANR-related information of the designated cell from the second node is not obtainable to the first node, the first node configures measurement and instructs the terminal to report the ANR-related information, or requests the second node to configure measurement and instruct the terminal to report the ANR-related information.

A network device provided in an embodiment of this application includes a processor and a memory. The memory is configured to store a computer program, and the processor is configured to invoke and run the computer program stored in the memory to perform the foregoing neighbor relation maintaining method.

A chip provided in an embodiment of this application is configured to implement the foregoing neighbor relation maintaining method.

Specifically, the chip includes: a processor, configured to invoke and run a computer program stored in a memory to enable a device equipped with the chip to perform the foregoing neighbor relation maintaining method.

A computer-readable storage medium provided in an embodiment of this application is configured to store a computer program, where the computer program enables a computer to perform the foregoing neighbor relation maintaining method.

A computer program product provided in an embodiment of this application includes a computer program instruction, where the computer program instruction enables a computer to perform the foregoing neighbor relation maintaining method.

An embodiment of this application provides a computer program, when the computer program is run on a computer, the computer is enabled to perform the foregoing neighbor relation maintaining method.

The ANR function in the DC network is implemented by using the foregoing technical solutions, and neighbor relations of a plurality of serving cells on two network nodes can be simultaneously maintained through an ANR reporting function of a network node.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the accompanying drawings:

FIG. 1 is a schematic diagram of a communication system architecture according to an embodiment of this application;

FIG. 2 is a schematic flowchart 1 of a neighbor relation maintaining method according to an embodiment of this application;

FIG. 3 is a schematic flowchart 2 of a neighbor relation maintaining method according to an embodiment of this application;

DETAILED DESCRIPTION

Figure 4:
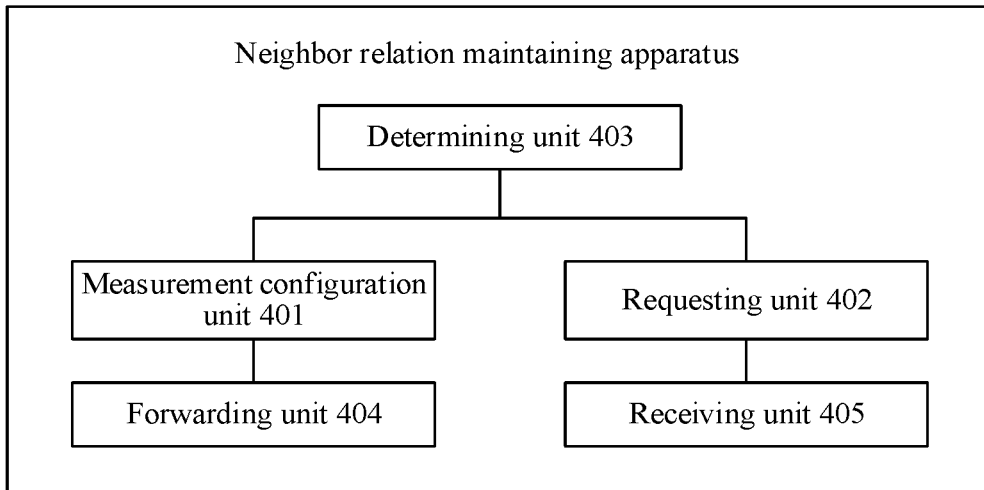
FIG. 4 is a schematic structural composition diagram 1 of a neighbor relation maintaining apparatus according to an embodiment of this application.

The technical solutions of the embodiments of this application will be described in the following with reference to the accompanying drawings in the embodiments of this application. It is obvious that the described embodiments are some rather than all of the embodiments of this application. All other embodiments obtained by a person of ordinary skill in the art based on the embodiments of this application without creative efforts shall fall within the protection scope of this application.

The technical solutions in the embodiments of this application can be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, or a 5G system.

For example, a communications system 100 used in an embodiment of this application is shown in FIG. 1. The communications system 100 may include a network device 110, and the network device 110 may be a device communicating with a terminal 120 (or referred to as a communications terminal or a terminal). The network device 110 may provide communications coverage for a specific geographic area, and may communicate with a terminal located inside the covered area. Optionally, the network device 110 may be a base transceiver station (BTS) in a GSM system or a CDMA system, a NodeB (NB) in a WCDMA system, an evolved NodeB (eNB or eNodeB) in an LTE system, or a wireless controller in a cloud radio access network (CRAN). Alternatively, the network device may be a network side device in a mobile switching center, a relay station, an access point, an in-vehicle device, a wearable device, a hub, a switch, a bridge, a router, or a 5G network, or may be a network device or the like in a future evolved public land mobile network (PLMN).

The communications system 100 further includes at least one terminal 120 located inside a coverage area of the network device 110. The "terminal" used herein includes, but is not limited to: being connected through a wired line, for example, through a public switched telephone network (PSTN), a digital subscriber line (DSL), a digital cable, or a direct cable; and/or another data connection/network; and/or being connected through a wireless interface, for example, through a cellular network, a wireless local area network (WLAN), a digital television network such as a DVB-H network, a satellite network, or an AM-FM broadcast transmitter; and/or an apparatus of another terminal that is configured to receive/send communications signals; and/or an Internet of Things (IoT) device. The terminal that is configured to communicate through the wireless interface may be referred to as a "wireless communications terminal", a "wireless terminal", or a "mobile terminal". An example of the mobile terminal includes, but is not limited to, a satellite or a cellular phone; a personal communications system (PCS) terminal that combines a cellular radio telephone, data processing, fax, and data communication capabilities; and may be a PDA including a radio telephone, a beeper, Internet/Intranet access, a web browser, a memo pad, a calendar, and/or a global positioning system (GPS) receiver; and may be a conventional laptop and/or palmtop receiver or another electronic apparatus including a radio telephone transceiver. The terminal may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, a terminal in a future evolved PLMN, or the like.

Optionally, the terminals 120 may perform device to device (D2D) communication with each other.

Optionally, a 5G system or a 5G network may also be referred to as a new radio (NR) system or an NR network.

FIG. 1 illustratively shows one network device and two terminals. Optionally, the communications system 100 may include a plurality of network devices, and in a coverage area of each network device, another quantity of terminals may be included. This is not limited in the embodiments of this application.

Optionally, the communications system 100 may further include another network entity such as a network controller or a mobility management entity. This is not limited in the embodiments of this application.

It should be understood that, in a network/system in the embodiments of this application, a device having a communication function can be referred to as a communications device. Using the communications system 100 shown in FIG. 1 as an example, the communications device may include a network device 110 and a terminal 120 that have a communications function. The network device 110 and the terminal 120 can be specific devices described above. Details are not described herein again. The communications device may further include other devices in the communications system 100, for example, other network entities such as a network controller and a mobility management entity. This is not limited in the embodiments of this application.

It should be understood that, terms "system" and "network" in this specification are usually interchangeably used in this specification. The term "and/or" in this specification is only an association relationship for describing associated objects, and represents that three relationships may exist, for example, A and/or B may represent the following three cases: A exists separately, both A and B exist, and B exists separately. In addition, the character "/" in this specification generally indicates an "or" relationship between the associated objects.

The technical solutions in the embodiments of this application are mainly applied to a 5G mobile communications system. Certainly, the technical solutions in the embodiments of this application are not limited to the 5G mobile communications system, and may alternatively be applied to other types of mobile communications systems. Main application scenarios in the 5G mobile communications system are described below.

(1) eMBB scenario: eMBB aims at that a user obtains multimedia content, a service, and data, and its service demands increase rapidly. Because eMBB may be deployed in different scenarios, for example, indoor scenarios, cities, rural areas, and the like, and its service capacity is greatly different from its demands. Therefore, a service needs to be analyzed with reference to a specific deployment scenario.

(2) URLLC scenario: Typical applications of URLLC include: industrial automation, electric automation, telemedicine operations, traffic safeguard, and the like.

(3) mMTC scenario: Typical characteristics of URLLC include: high connection density, a small data volume, a latency insensitive service, low costs and a long service life of a module, and the like.

In an NR discussion, it is agreed in R15, each NR carrier has a maximum channel bandwidth that is 100 MHz for a low frequency and that is 400 MHz for a high frequency. In addition, the 100 MHz/400 MHz channel bandwidth is continuous. If the UE keeps working on a broadband carrier, power consumption of the UE is high. Therefore, it is suggested that radio frequency (RF) bandwidth of the UE is adjustable according to an actual throughput of the UE. Configuration and sending of a plurality of synchronous signal block (SSB, SSS/PSS and PBCH Block) of a defined cell are defined on an entire broadband carrier of a 5G broadband cell. Because receive bandwidth of an idle UE is smaller than bandwidth of a broadband cell, after finding the SSB of the defined cell through a search, the UE obtains system broadcast information, and camps. Therefore, on the entire broadband carrier of the 5G broadband cell, idle UEs are randomly distributed at frequency points at which all SSBs of the defined cell are located.

In the LTE, a SON is provided with an ANR function, and an LTE base station can report a found missing neighbor relation through measurement of UE, further maintain integrity and effectiveness of a neighboring cell list, and reduce abnormal neighboring cell switching, thereby improving network performance, avoiding manual operation, and reducing operation and maintenance costs of the network. Furthermore, a neighbor relation of the LTE includes an intra-LTE cell neighbor relation of and an inter-RAT neighbor relation. With deployment of the NR network, an NR cell needs to maintain the inter-RAT neighbor relation of the LTE. In addition, the NR cell also needs to support the ANR function, and maintain the missing neighboring cell in its neighbor relation list.

According to another aspect, a DC architecture includes EN-DC, NE-DC, 5GC-EN-DC, and NR DC. In the EN-DC, an LTE node serving as an MN node and an NR node serving as an SN node are connected to an EPC core network. In the NE-DC, an NR node serving as an MN node and an eLTE node serving as an SN node are connected to a 5GC core network. In the 5GC-EN-DC, an eLTE node serving as an MN node and an NR node serving an SN node are connected to a 5GC core network. In the NR DC, an NR node serving as an MN node and an NR node serving as an SN node are connected to a 5GC core network.

The technical solutions in the embodiments of this application may be applied to any type of the DC architectures above. FIG. 2 is a schematic flowchart 1 of a neighbor relation maintaining method according to an embodiment of this application. As shown in FIG. 2, the neighbor relation maintaining method includes the following steps.

Step 201. A first node configures measurement and instructs a terminal to ANR-related information, or requests a second node to configure measurement and instruct the terminal to report the ANR-related information, where if the first node configures measurement and instructs the terminal to report the ANR-related information, the first node maintains, based on the ANR-related information, a neighbor relation of a cell included by the first node, and forwards the ANR-related information to the second node for the second node to maintain a neighbor relation of a cell included by the second node; and if the second node configures measurement and instructs the terminal to report the ANR-related information, the second node maintains, based on the ANR-related information, the neighbor relation of the cell included by the second node, and forwards the ANR-related information to the first node for the first node to maintain the neighbor relation of the cell included by the first node.

In this embodiment of this application, the terminal may be any device that can communicate with a network, for example, a mobile phone, a tablet computer, an in-vehicle terminal, or a notebook computer. Furthermore, the terminal is configured to be in a DC mode. In the DC mode, the terminal can simultaneously communicate with two network nodes, and the two network nodes are the first node and the second node respectively.

In this embodiment of this application, the first node is a master node (MN) in a dual connectivity network, and the second node is a secondary node (SN) in the dual connectivity network; or the second node is a master node (MN) in the dual connectivity network, and the first node is a secondary node (SN) in the dual connectivity network.

Furthermore, types of the first node and the second node may be the same or different. For example, the first node is an LTE base station, and the second node is an NR base station. For another example, the first node and the second node are both NR base stations.

In this embodiment of this application, using that the terminal reports a measurement report to the first node as an example, the first node is an MN or an SN. Specifically, the first node receives the measurement report sent by the terminal, determines, based on the measurement report that a target cell is not in a neighbor relation list of a cell included by the first node, and then performs one of the following two actions.

(1) First action: The first node configures, based on frequency point information and/or physical cell identifier (PCI) information of the target cell, measurement and instructs the terminal to report first information of a designated cell and/or system broadcast information of at least one cell.

Herein, the first information of the designated cell includes at least one of the following: a public land mobile network PLMN list, frequency point information, PCI information, a cell identifier, a TAC, and an RNAC.

Herein, the system broadcast information of the at least one cell may be information broadcast in system broadcast of any cell.

In this embodiment of this application, the first information of the designated cell and/or the system broadcast information of the at least one cell reported by the terminal to the first node are or is used for the first node to maintain a neighbor relation of a cell included by the first node. Herein, that the first node maintains the neighbor relation of the cell included by the first node means that: each serving cell of the terminal included by the first node determines whether the designated cell is a neighboring cell of the serving cell.

For example, the first node includes four serving cells, and the four serving cells all determine whether the designated cell is a missing neighboring cell, and if yes, the four serving cells add the designated cell to their neighbor relation lists.

In this embodiment of this application, the first node sends at least one of the first information of the designated cell, the system broadcast information of the at least one cell, a measurement result of the designated cell, a measurement result of the serving cell of the terminal, and a measurement result of the neighboring cell to the second node for the second node to maintain a neighbor relation of a cell included by the second node. Herein that the second node maintains the neighbor relation of the cell included by the second node means that: each serving cell of the terminal included by the second node determines whether the designated cell is a neighboring cell of the serving cell.

For example, the second node includes two serving cells, and the two serving cells all determine whether the designated cell is a missing neighboring cell, and if yes, the two serving cells add the designated cell to their neighbor relation lists.

(2) Second action: The first node requests, based on frequency point information and/or PCI information of the target cell, the second node to configure measurement and instruct the terminal to report information related to the designated cell.

In this embodiment of this application, the second node configures, based on the frequency point information and/or the PCI information of the target cell, measurement and instructs the terminal to report first information of the designated cell and/or system broadcast information of at least one cell. Herein, that the second node maintains the neighbor relation of the cell included by the second node means that: each serving cell of the terminal included by the second node determines whether the designated cell is a neighboring cell of the serving cell.

Herein, the first information of the designated cell includes at least one of the following: a public land mobile network PLMN list, frequency point information, PCI information, a cell identifier, a TAC, and an RNAC.

Herein, the system broadcast information of the at least one cell may be information broadcast in system broadcast of any cell.

In this embodiment of this application, the first node receives at least one of the first information of the designated cell, the system broadcast information of the at least one cell, a measurement result of the designated cell, a measurement result of the serving cell of the terminal, and a measurement result of the neighboring cell sent by the second node, for the first node to maintain a neighbor relation of a cell included by the first node. Herein, that the first node maintains the neighbor relation of the cell included by the first node means that: each serving cell of the terminal included by the first node determines whether the designated cell is a neighboring cell of the serving cell.

It should be noted that, the designated cell in the embodiment of this application may be a cell or a plurality of cells. Furthermore, the designated cell includes the target cell. In an implementation, the target cell is a cell having best signal quality measured by the terminal.

FIG. 3 is a schematic flowchart 2 of a neighbor relation maintaining method according to an embodiment of this application. As shown in FIG. 3, the neighbor relation maintaining method includes the following steps:

Step 301. A first node receives a measurement report sent by a terminal, and determines, based on the measurement report, that a target cell is not in a neighbor relation list of a cell included by the first node.

In this embodiment of this application, the terminal may be any device that can communicate with a network, for example, a mobile phone, a tablet computer, an in-vehicle terminal, or a notebook computer. Furthermore, the terminal is configured to be in a DC mode. In the DC mode, the terminal can simultaneously communicate with two network nodes, and the two network nodes are the first node and the second node respectively.

In this embodiment of this application, the first node is a master node (MN) in a dual connectivity network, and the second node is a secondary node (SN) in the dual connectivity network; or the second node is a master node (MN) in the dual connectivity network, and the first node is a secondary node (SN) in the dual connectivity network.

Furthermore, types of the first node and the second node may be the same or different. For example, the first node is an LTE base station, and the second node is an NR base station. For another example, the first node and the second node are both NR base stations.

In this embodiment of this application, using that the terminal reports a measurement report to the first node as an example, the first node is an MN or an SN. Specifically, the first node receives the measurement report sent by the terminal, and determines, based on the measurement report that a target cell is not in a neighbor relation list of a cell included by the first node.

Step 302. The first node requests, based on frequency point information and/or PCI information of the target cell, ANR-related information of a designated cell from a second node, where if the ANR-related information of the designated cell from the second node is obtainable to the first node, the first node maintains, based on the ANR-related information, a neighbor relation of the cell included by the first node; and if the ANR-related information of the designated cell from the second node is not obtainable to the first node, the first node configures measurement and instructs the terminal to report the ANR-related information, or requests the second node to configure measurement and instruct the terminal to report the ANR-related information.

Specifically, the first node sends a request message to the second node, where the request message includes at least one of the following: frequency point information of the target cell, PCI information of the target cell, and cell identifier information of a serving cell on a side of the first node for the terminal. Furthermore, the cell identifier information of a serving cell on a side of the first node for the terminal includes at least one of the following: a PLMN list, frequency point information, PCI information, a cell identifier, a TAC, and an RNAC.

It should be noted that, the designated cell in the embodiment of this application may be a cell or a plurality of cells. Furthermore, the designated cell includes the target cell. In an implementation, the target cell is a cell having best signal quality measured by the terminal.

After receiving the request message, the second node looks up, according to the frequency point information and/or the PCI information of the target cell, a neighbor relation table and a cell list for which the second node is responsible, if the ANR-related information of the designated cell is found, sends the information to the first node, and if the ANR-related information of the designated cell is not found, performs one of the following two actions.

(1) First action: The first node configures measurement and instructs a terminal to ANR-related information. Specifically, the first node maintains, based on the ANR-related information, a neighbor relation of a cell included by the first node, and forwards the ANR-related information to the second node for the second node to maintain a neighbor relation of a cell included by the second node. The ANR-related information includes first information of the designated cell and/or system broadcast information of at least one cell, where the first information of the designated cell includes at least one of the following: a PLMN list, frequency point information, PCI information, a cell identifier, a TAC, and an RNAC.

Specifically, the first node configures, based on the frequency point information and/or the physical cell identifier (PCI) information of the target cell, measurement and instructs the terminal to report first information of a designated cell and/or system broadcast information of at least one cell.

Herein, the first information of the designated cell includes at least one of the following: a public land mobile network PLMN list, frequency point information, PCI information, a cell identifier, a TAC, and an RNAC.

Herein, the system broadcast information of the at least one cell may be information broadcast in system broadcast of any cell.

In this embodiment of this application, the first information of the designated cell and/or the system broadcast information of the at least one cell reported by the terminal to the first node are or is used for the first node to maintain a neighbor relation of a cell included by the first node. Herein, that the first node maintains the neighbor relation of the cell included by the first node means that: each serving cell of the terminal included by the first node determines whether the designated cell is a neighboring cell of the serving cell.

For example, the first node includes four serving cells, and the four serving cells all determine whether the designated cell is a missing neighboring cell, and if yes, the four serving cells add the designated cell to their neighbor relation lists.

In this embodiment of this application, the first node sends at least one of the first information of the designated cell, the system broadcast information of the at least one cell, a measurement result of the designated cell, a measurement result of the serving cell of the terminal, and a measurement result of the neighboring cell to the second node for the second node to maintain a neighbor relation of a cell included by the second node. Herein, that the second node maintains the neighbor relation of the cell included by the second node means that: each serving cell of the terminal included by the second node determines whether the designated cell is a neighboring cell of the serving cell.

For example, the second node includes two serving cells, and the two serving cells both determine whether the designated cell is a missing neighboring cell, and if yes, the two serving cells add the designated cell to their neighbor relation lists.

(2) Second action: The first node requests the second node to configure measurement and instruct the terminal to report the ANR-related information. Specifically, the second node configures measurement and instructs the terminal to report the ANR-related information, and the second node maintains, based on the ANR-related information, a neighbor relation of a cell included by the second node, and forwards the ANR-related information to the first node for the first node to maintain a neighbor relation of a cell included by the first node. The ANR-related information includes first information of the designated cell and/or system broadcast information of at least one cell, where the first information of the designated cell includes at least one of the following: a PLMN list, frequency point information, PCI information, a cell identifier, a TAC, and an RNAC.

In this embodiment of this application, the second node configures, based on the frequency point information and/or the PCI information of the target cell, measurement and instructs the terminal to report first information of a designated cell and/or system broadcast information of at least one cell. Herein, that the second node maintains the neighbor relation of the cell included by the second node means that: each serving cell of the terminal included by the second node determines whether the designated cell is a neighboring cell of the serving cell.

Herein, the first information of the designated cell includes at least one of the following: a public land mobile network PLMN list, frequency point information, PCI information, a cell identifier, a TAC, and an RNAC.

Herein, the system broadcast information of the at least one cell may be information broadcast in system broadcast of any cell.

In this embodiment of this application, the first node receives at least one of the first information of the designated cell, the system broadcast information of the at least one cell, a measurement result of the designated cell, a measurement result of the serving cell of the terminal, and a measurement result of the neighboring cell sent by the second node, for the first node to maintain a neighbor relation of a cell included by the first node. Herein, that the first node maintains the neighbor relation of the cell included by the first node means that: each serving cell of the terminal included by the first node determines whether the designated cell is a neighboring cell of the serving cell.

FIG. 4 is a schematic structural composition diagram 1 of a neighbor relation maintaining apparatus according to an embodiment of this application. The apparatus is applied to a first node, and as shown in FIG. 4, includes:

a measurement configuration unit 401, configured to configure measurement and instruct a terminal to ANR-related information, or request a second node to configure measurement and instruct the terminal to report the ANR-related information; and a requesting unit 402, configured to request the second node to configure measurement and instruct the terminal to report the ANR-related information.

If the first node configures measurement and instructs the terminal to report the ANR-related information, the first node maintains, based on the ANR-related information, a neighbor relation of a cell included by the first node, and forwards the ANR-related information to the second node for the second node to maintain a neighbor relation of a cell included by the second node; and if the second node configures measurement and instructs the terminal to report the ANR-related information, the second node maintains, based on the ANR-related information, the neighbor relation of the cell included by the second node, and forwards the ANR-related information to the first node for the first node to maintain the neighbor relation of the cell included by the first node.

In an implementation, the apparatus further includes:

a determining unit 403, configured to receive a measurement report sent by a terminal, and determine, based on the measurement report, that a target cell is not in a neighbor relation list of the cell included by the first node.

The measurement configuration unit 401 is configured to configure measurement and instruct, based on frequency point information and/or PCI information of the target cell, the terminal to report first information of a designated cell and/or system broadcast information of at least one cell.

In an implementation, the first information of the designated cell and/or the system broadcast information of the at least one cell reported by the terminal to the first node are or is used for the first node to maintain a neighbor relation of a cell included by the first node.

In an implementation, that the first node maintains the neighbor relation of the cell included by the first node means that: each serving cell of the terminal included by the first node determines whether the designated cell is a neighboring cell of the serving cell.

In an implementation, the apparatus further includes:

a forwarding unit 404, configured to send at least one of the first information of the designated cell, the system broadcast information of the at least one cell, a measurement result of the designated cell, a measurement result of the serving cell of the terminal, and a measurement result of the neighboring cell to the second node for the second node to maintain the neighbor relation of the cell included by the second node.

In an implementation, that the second node maintains the neighbor relation of the cell included by the second node means that: each serving cell of the terminal included by the second node determines whether the designated cell is a neighboring cell of the serving cell.

In an implementation, the apparatus further includes:

a determining unit 403, configured to receive a measurement report sent by the terminal, and determine, based on the measurement report, that a target cell is not in a neighbor relation list of the cell included by the first node.

The requesting unit 402 is configured to request, based on frequency point information and/or PCI information of the target cell, the second node to configure measurement and instruct the terminal to report information related to the designated cell.

In an implementation, that the second node configures measurement and instructs the terminal to report information related to the designated cell includes:

configuring, by the second node based on the frequency point information and/or the PCI information of the target cell, measurement and instructing the terminal to report first information of a designated cell and/or system broadcast information of at least one cell.

In an implementation, the first information of the designated cell and/or the system broadcast information of the at least one cell reported by the terminal to the second node are or is used for the second node to maintain a neighbor relation of a cell included by the second node.

In an implementation, that the second node maintains the neighbor relation of the cell included by the second node means that: each serving cell of the terminal included by the second node determines whether the designated cell is a neighboring cell of the serving cell.

In an implementation, the apparatus further includes:

a receiving unit 405, configured to receive at least one of the first information of the designated cell, the system broadcast information of the at least one cell, a measurement result of the designated cell, a measurement result of the serving cell of the terminal, and a measurement result of the neighboring cell sent by the second node, for the first node to maintain a neighbor relation of a cell included by the first node.

In an implementation, that the first node maintains the neighbor relation of the cell included by the first node means that: each serving cell of the terminal included by the first node determines whether the designated cell is a neighboring cell of the serving cell.

In an implementation, the first information of the designated cell includes at least one of the following: a PLMN list, frequency point information, PCI information, a cell identifier, a TAC, and an RNAC.

In an implementation, the first node is a master node in a dual connectivity network, and the second node is a secondary node in the dual connectivity network; or the second node is a master node in the dual connectivity network, and the first node is a secondary node in the dual connectivity network.

A person skilled in the ordinary art should understand that, for related descriptions on the foregoing neighbor relation maintaining apparatus in the embodiments of this application, understanding may be made with reference to the related descriptions on the neighbor relation maintaining method in the embodiments of this application.

Figure 5:
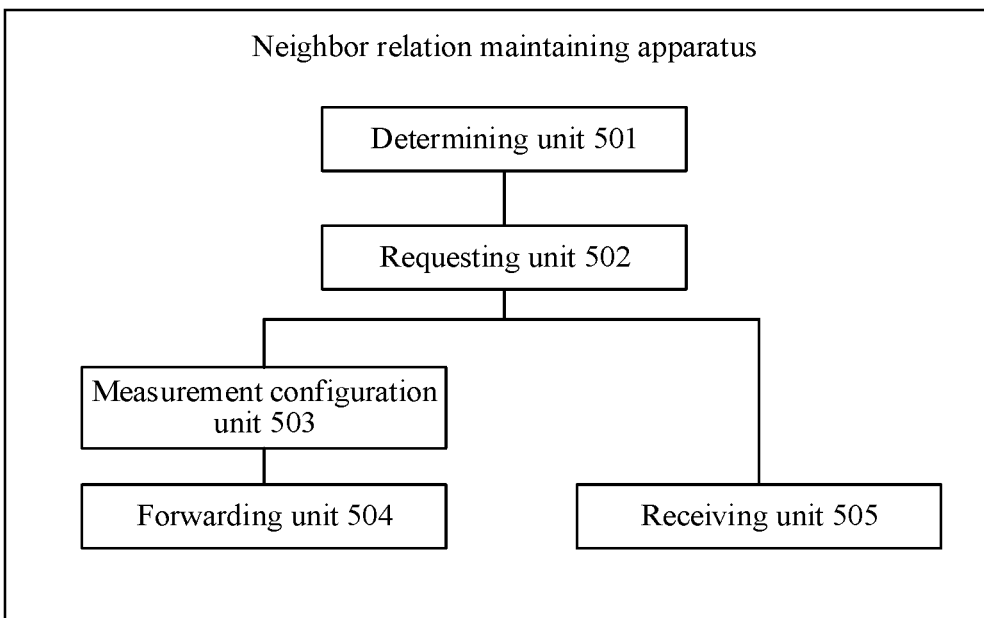
FIG. 5 is a schematic structural composition diagram 2 of a neighbor relation maintaining apparatus according to an embodiment of this application.

FIG. 5 is a schematic structural composition diagram 2 of a neighbor relation maintaining apparatus according to an embodiment of this application. The apparatus is applied to a first node, and as shown in FIG. 5, includes:

a determining unit 501, configured to receive a measurement report sent by a terminal, and determine, based on the measurement report, that a target cell is not in a neighbor relation list of the cell included by the first node; and a requesting unit 502, configured to request, based on frequency point information and/or PCI information of the target cell, ANR-related information of a designated cell from a second node.

If the ANR-related information of the designated cell from the second node is obtainable to the first node, the first node maintains, based on the ANR-related information, a neighbor relation of the cell included by the first node; and if the ANR-related information of the designated cell from the second node is not obtainable to the first node, the first node configures measurement and instructs the terminal to report the ANR-related information, or requests the second node to configure measurement and instruct the terminal to report the ANR-related information.

In an implementation, the requesting unit 502 is configured to send a request message to the second node, where the request message includes at least one of the following: frequency point information of the target cell, PCI information of the target cell, and cell identifier information of a serving cell on a side of the first node for the terminal.

In an implementation, the cell identifier information of a serving cell on a side of the first node for the terminal includes at least one of the following: a PLMN list, frequency point information, PCI information, a cell identifier, a TAC, and an RNAC.

In an implementation, corresponding to that the first node configures measurement and instructs the terminal to report the ANR-related information, the apparatus further includes: a measurement configuration unit 503 and a forwarding unit 504.

The measurement configuration unit 503 is configured to configure measurement and instruct a terminal to ANR-related information, and maintain, based on the information of the ANR, a neighbor relation of a cell included by the first node.

The forwarding unit 504 is configured to forward the ANR-related information to the second node for the second node to maintain a neighbor relation of a cell included by the second node.

Corresponding to that the first node requests the second node to configure measurement and instruct the terminal to report the ANR-related information, the apparatus further includes: a receiving unit 505.

The receiving unit 505 is configured to receive the ANR-related information sent by the second node for the first node to maintain the neighbor relation of the cell included by the first node.

In an implementation, the ANR-related information includes first information of the designated cell and/or system broadcast information of at least one cell, where the first information of the designated cell includes at least one of the following: a PLMN list, frequency point information, PCI information, a cell identifier, a TAC, and an RNAC.

In an implementation, the first node is a master node in a dual connectivity network, and the second node is a secondary node in the dual connectivity network; or the second node is a master node in the dual connectivity network, and the first node is a secondary node in the dual connectivity network.

A person skilled in the ordinary art should understand that, for related descriptions on the foregoing neighbor relation maintaining apparatus in the embodiments of this application, understanding may be made with reference to the related descriptions on the neighbor relation maintaining method in the embodiments of this application.

Figure 6:
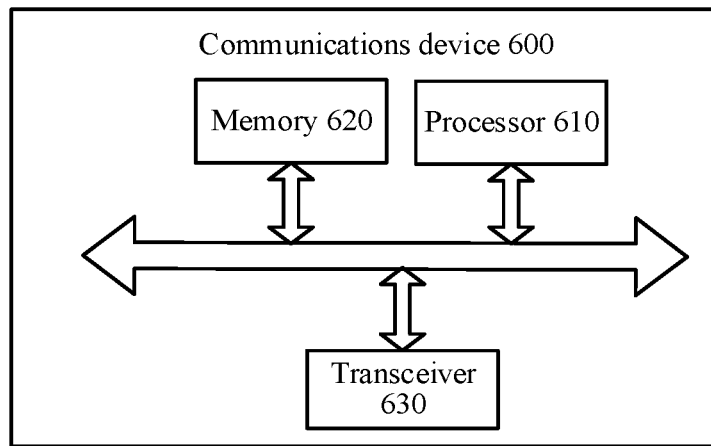
FIG. 6 is a schematic structural diagram of a communications device according to an embodiment of this application.

FIG. 6 is a schematic structural diagram of a communications device 600 according to an embodiment of this application. The communications device may be a network device (for example, an MN or an SN in DC). The communications device 600 shown in FIG. 6 includes a processor 610. The processor 610 may invoke and run a computer program in a memory, to implement the method in the embodiments of this application.

Optionally, as shown in FIG. 6, the communications device 600 may further include a memory 620. The processor 610 may invoke and run a computer program in the memory 620, to implement the method in the embodiments of this application.

The memory 620 may be a component independent of the processor 610, or may be integrated into the processor 610.

Optionally, as shown in FIG. 6, the communications device 600 may further include a transceiver 630, and the processor 610 can control the transceiver 630 to communicate with another device. Specifically, the transceiver 630 sends information or data to another device, or receives information or data sent by another device.

The transceiver 630 may include a transmitter and a receiver. The transceiver 630 may further include an antenna, and a quantity of the antenna can be one or more.

Optionally, the communications device 600 may specifically be a network device in this embodiment of this application, and the communications device 600 can implement corresponding procedures implemented by the network device in various methods in the embodiments of this application. For brevity, details are not described herein again.

Optionally, the communications device 600 may specifically be a mobile terminal/a terminal in the embodiments of this application, and the communications device 600 can implement corresponding procedures implemented by the mobile terminal/the terminal in various methods in the embodiments of this application. For brevity, details are not described herein again.

Figure 7:
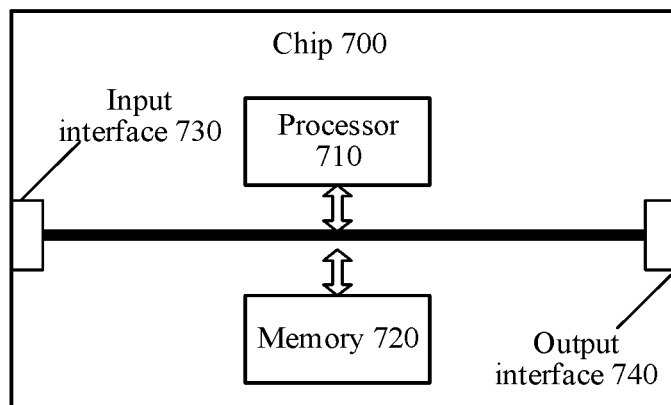
FIG. 7 is a schematic structural diagram of a chip according to an embodiment of this application.

FIG. 7 is a schematic structural diagram of a chip according to an embodiment of this application. A chip 700 shown in FIG. 7 includes a processor 710. The processor 710 may invoke and run a computer program in a memory, to implement the method in the embodiments of this application.

Optionally, as shown in FIG. 7, the chip 700 may further include a memory 720. The processor 710 may invoke and run a computer program in the memory 720, to implement the method in the embodiments of this application.

The memory 720 may be a component independent of the processor 710, or may be integrated into the processor 710.

Optionally, the chip 700 may further include an input interface 730. The processor 710 may control the input interface 730 to communicate with another device or chip, and specifically, may obtain information or data sent by another device or chip.

Optionally, the chip 700 may further include an output interface 740. The processor 710 may control the output interface 740 to communicate with another device or chip, and specifically, may output information or data to another device or chip.

Optionally, the chip may be applied to the network device in the embodiments of this application, and the chip can implement corresponding procedures implemented by the network device in various methods in the embodiments of this application. For brevity, details are not described herein again.

Optionally, the chip may be applied to a mobile terminal/a terminal in the embodiments of this application, and the chip can implement corresponding procedures implemented by the mobile terminal/the terminal in various methods in the embodiments of this application. For brevity, details are not described herein again.

It should be understood that, the chip mentioned in this embodiment of this application may also be referred to as a system-level chip, a system chip, a chip system, a system on chip, or the like.

Figure 8:
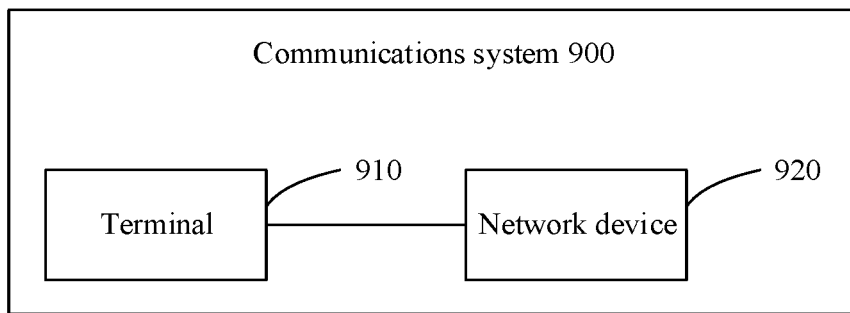
FIG. 8 is a schematic block diagram of a communications system according to an embodiment of this application.

FIG. 8 is a schematic block diagram of a communications system 900 according to an embodiment of this application. As shown in FIG. 8, the communications system 900 includes a terminal 910 and a network device 920.

The terminal 910 may be configured to implement the corresponding functions implemented by a terminal in the foregoing method, and the network device 920 may be configured to implement the corresponding functions implemented by a network device in the foregoing method. For brevity, details are not described herein again.

It should be understood that, the processor of this embodiment of this application may be an integrated circuit chip, and has a signal processing capability. During implementation, the steps of the foregoing method embodiment may be implemented by using a hardware integrated logic circuit in the processor or implemented by using an instruction in a software form. The foregoing processor may be a general-purpose processor, a digital signal processor (DSP), an application-specific integrated circuit (ASIC), a field programmable gate array (FPGA), or another programmable logical device, discrete gate or transistor logical device, or discrete hardware component, and may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed or completed by using a hardware decoding processor, or may be performed or completed by using a combination of hardware and a software module in the decoding processor. The software module may be located in a mature storage medium in the art, for example, a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

It can be understood that, the memory in the embodiments of this application may be a volatile memory or a non-volatile memory, or may include both a volatile memory and a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through exemplary but not limitative description, RAMs in many forms may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that, the memory for the system and the method described herein aims to include, but not limited to, the memories and any other suitable types of memories.

It should be understood that, the foregoing description of the memory is illustrative, but is not limitative. For example, the memory in the embodiments of this application may alternatively be a static RAM (SRAM), a dynamic RAM (DRAM), a synchronous DRAM (SDRAM), a double data rate SDRAM (DDR SDRAM), an enhanced SDRAM (ESDRAM), a synchlink SDRAM (SLDRAM), a direct rambus RAM (DR RAM), or the like. That is, the memory described in this embodiment of this application aims to include, but not limited to, the memories and any other suitable types of memories.

An embodiment of this application further provides a computer-readable storage medium, configured to store a computer program.

Optionally, the computer-readable storage medium may be applied to the network device in the embodiments of this application, and the computer program enables a computer to perform corresponding procedures implemented by the network device in the methods in the embodiments of this application. For brevity, details are not described herein again.

Optionally, the computer-readable storage medium may be applied to the network device in the mobile terminal/the terminal in the embodiments of this application, and the computer program enables a computer to perform corresponding procedures implemented by the mobile terminal/the terminal in the methods in the embodiments of this application. For brevity, details are not described herein again.

An embodiment of this application further provides a computer program product, including a computer program instruction.

Optionally, the computer program product may be applied to the network device in the embodiments of this application, and the computer program instruction enables a computer to perform corresponding procedures implemented by the network device in the methods in the embodiments of this application. For brevity, details are not described herein again.

Optionally, the computer program product may be applied to the mobile terminal/the terminal in the embodiments of this application, and the computer program instruction enables a computer to perform corresponding procedures implemented by the mobile terminal/the terminal in the methods in the embodiments of this application. For brevity, details are not described herein again.

An embodiment of this application further provides a computer program.

Optionally, the computer program may be applied to the network device in the embodiments of this application, and when the computer program is run on the computer, the computer is enabled to perform corresponding procedures implemented by the network device in the methods in the embodiments of this application. For brevity, details are not described herein again.

Optionally, the computer program may be applied to the network device in the mobile terminal/the terminal in the embodiments of this application, and when the computer program is run on the computer, the computer is enabled to perform corresponding procedures implemented by the mobile terminal/the terminal in the methods in the embodiments of this application. For brevity, details are not described herein again.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

If implemented in the form of software functional units and sold or used as an independent product, the functions may also be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of this application. The foregoing storage medium includes: any medium that can store program code, such as a USB flash disk, a removable hard disk, a read-only memory (ROM), a random access memory (RAM), a magnetic disk, or an optical disc.

The descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A neighbor relation maintaining method, the method comprising:
   requesting, by a first node, a second node to configure measurement and instruct a terminal to report automatic neighbor relation ANR-related information, wherein
   the second node configures measurement and instructs the terminal to report the ANR-related information, and the second node forwards the ANR-related information to the first node for the first node to maintain the neighbor relation of the cell comprised by the first node,
   wherein the requesting, by a first node, a second node to configure measurement and instruct a terminal to report ANR-related information comprises:
   requesting, by the first node, based on at least one of frequency point information or PCI information of a target cell, the second node to configure the measurement and instruct the terminal to report information related to a designated cell,
   wherein that the second node configures the measurement and instructs the terminal to report information related to the designated cell comprises:
   configuring, by the second node based on at least one of the frequency point information or the PCI information of the target cell, the measurement and instructing the terminal to report at least one of first information of the designated cell or system broadcast information of at least one cell.

2. The method according to claim 1, further comprising:
   receiving, by the first node, a measurement report sent by the terminal, and determining, based on the measurement report, that the target cell is not in a neighbor relation list of the cell comprised by the first node.

3. The method according to claim 1, further comprising:
   receiving, by the first node, at least one of first information of the designated cell, system broadcast information of the at least one cell, a measurement result of the designated cell, a measurement result of a serving cell of the terminal, or a measurement result of a neighboring cell sent by the second node, for the first node to maintain the neighbor relation of the cell comprised by the first node.

4. The method according to claim 1, wherein the first information of the designated cell comprises at least one of the following: a public land mobile network PLMN list, frequency point information, PCI information, a cell identifier, a tracking area code TAC, or an RNAC.

5. The method according to claim 1, wherein
   the first node is a master node in a dual connectivity network, and the second node is a secondary node in the dual connectivity network; or
   the second node is a master node in the dual connectivity network, and the first node is a secondary node in the dual connectivity network.

6. A neighbor relation maintaining apparatus, wherein the apparatus is applied to a first node, and comprises: a transceiver, a processor and a memory for storing instructions executable by the processor, wherein the processor is configured to:
    request a second node to configure measurement and instruct the terminal to report automatic neighbor relation ANR-related information, wherein
        the second node configures measurement and instructs the terminal to report the ANR-related information, and the second node forwards the ANR-related information to the first node for the first node to maintain the neighbor relation of the cell comprised by the first node,
    wherein the processor is further configured to request, based on at least one of frequency point information or PCI information of a target cell, the second node to configure the measurement and instruct the terminal to report information related to a designated cell,
    wherein that the second node configures the measurement and instructs the terminal to report information related to the designated cell comprises:
    configuring, by the second node based on at least one of the frequency point information or the PCI information of the target cell, the measurement and instructing the terminal to report at least one of first information of the designated cell or system broadcast information of at least one cell.

7. The apparatus according to claim 6, wherein
    the transceiver is configured to receive a measurement report sent by the terminal, and determine, based on the measurement report, that the target cell is not in a neighbor relation list of the cell comprised by the first node.

8. The apparatus according to claim 6, wherein the transceiver is configured to:
    receive at least one of first information of the designated cell, system broadcast information of at least one cell, a measurement result of the designated cell, a measurement result of a serving cell of the terminal, or a measurement result of a neighboring cell sent by the second node, for the first node to maintain the neighbor relation of the cell comprised by the first node.

9. The apparatus according to claim 6, wherein the first information of the designated cell comprises at least one of the following: a PLMN list, frequency point information, PCI information, a cell identifier, a TAC, or an RNAC.

10. The apparatus according to claim 6, wherein
    the first node is a master node in a dual connectivity network, and the second node is a secondary node in the dual connectivity network; or
    the second node is a master node in the dual connectivity network, and the first node is a secondary node in the dual connectivity network.

11. A neighbor relation maintaining apparatus, wherein the apparatus is applied to a first node, and comprises: a transceiver, a processor and a memory for storing instructions executable by the processor, wherein
    the transceiver is configured to receive a measurement report sent by the terminal, and determine, based on the measurement report, that a target cell is not in a neighbor relation list of the cell comprised by the first node;
    the processor is configured to request, based on at least one of frequency point information or PCI information of the target cell, ANR-related information of a designated cell from a second node, wherein
    if the ANR-related information of the designated cell from the second node is obtainable to the first node, the first node maintains, based on the ANR-related information, a neighbor relation of the cell comprised by the first node; and if the ANR-related information of the designated cell from the second node is not obtainable to the first node, the first node configures measurement and instructs the terminal to report the ANR-related information, or requests the second node to configure measurement and instruct the terminal to report the ANR-related information.

12. The apparatus according to claim 11, wherein the processor is configured to send a request message to the second node, and the request message comprises at least one of the following: frequency point information of the target cell, PCI information of the target cell, or cell identifier information of a serving cell on a side of the first node for the terminal.

13. The apparatus according to claim 12, wherein the cell identifier information of a serving cell on a side of the first node for the terminal comprises at least one of the following: a PLMN list, frequency point information, PCI information, a cell identifier, a TAC, or an RNAC.

14. The apparatus claim 11, wherein the processor is configured to:
    responsive to that the first node configures measurement and instructs the terminal to report the ANR-related information, configure measurement and instruct the terminal to report the ANR-related information, and maintain a neighbor relation of a cell comprised by the first node based on the information of the ANR; and forward the ANR-related information to the second node for the second node to maintain a neighbor relation of a cell comprised by the second node;
    responsive to that the first node requests the second node to configure measurement and instruct the terminal to report the ANR-related information, receive the ANR-related information sent by the second node for the first node to maintain the neighbor relation of the cell comprised by the first node.

15. The apparatus according to claim 11, wherein the ANR-related information comprises at least one of first information of the designated cell or system broadcast information of at least one cell, wherein the first information of the designated cell comprises at least one of the following: a PLMN list, frequency point information, PCI information, a cell identifier, a TAC, or an RNAC.

16. The apparatus according to claim 11, wherein
    the first node is a master node in a dual connectivity network, and the second node is a secondary node in the dual connectivity network; or
    the second node is a master node in the dual connectivity network, and the first node is a secondary node in the dual connectivity network.

\* \* \* \* \*